(12) United States Patent
Jenkins et al.

(10) Patent No.: US 11,518,010 B2
(45) Date of Patent: Dec. 6, 2022

(54) TORQUE TOOL

(71) Applicant: STAHLWILLE Eduard Wille GmbH & Co. KG, Wuppertal (DE)

(72) Inventors: Brad Jenkins, Monrovia, CA (US); Rainer Schwafertz, Remscheid (DE)

(73) Assignee: STAHLWILLE Eduard Wille GmbH & Co. KG, Wuppertal (DE)

( * ) Notice: Subject to any disclaimer, the term of this patent is extended or adjusted under 35 U.S.C. 154(b) by 150 days.

(21) Appl. No.: 16/961,275

(22) PCT Filed: Jan. 7, 2019

(86) PCT No.: PCT/DE2019/100003
§ 371 (c)(1),
(2) Date: Jul. 10, 2020

(87) PCT Pub. No.: WO2019/137578
PCT Pub. Date: Jul. 18, 2019

(65) Prior Publication Data
US 2021/0069879 A1 Mar. 11, 2021

(30) Foreign Application Priority Data
Jan. 12, 2018 (DE) .................... 10 2018 100 664.0

(51) Int. Cl.
*B25B 23/142* (2006.01)
*B23P 19/06* (2006.01)
*B25B 23/14* (2006.01)

(52) U.S. Cl.
CPC ........ *B25B 23/1425* (2013.01); *B23P 19/066* (2013.01); *B25B 23/141* (2013.01); *B25B 23/1427* (2013.01)

(58) Field of Classification Search
CPC .............. B25B 23/1425; B25B 23/141; B25B 23/1427; F16D 7/10; F16D 43/208; F16D 15/00; F16D 27/118
(Continued)

(56) References Cited

U.S. PATENT DOCUMENTS 3,693,381 A * 9/1972 McGee ................. B25B 23/145
                                                                81/474
4,898,068 A    2/1990 Neuhaus
(Continued)

FOREIGN PATENT DOCUMENTS

CN    1036162 A     10/1989
CN    2181374       11/1994
(Continued)

OTHER PUBLICATIONS

Jenkins, co-pending U.S. Appl. No. 16/961,290.

*Primary Examiner* — Joseph J Hail
*Assistant Examiner* — Robert C Moore
(74) *Attorney, Agent, or Firm* — Smartpat PLC (57) ABSTRACT

A setting torque tool to tighten a screw or a similar fastener to a target torque is disclosed. The torque tool comprises a main body with a housing and a drive shaft, which is firmly attached to the housing to transfer a torque. The drive shaft has a connection area, to which a drive can be connected. An adapter for an operating tool rotates together with the housing and the drive shaft to transfer the torque, Sensor measure and evaluate the torque transferred. A release mechanism, which is arranged in the housing, releases the torque tool upon reaching a target torque.

11 Claims, 8 Drawing Sheets

(58) Field of Classification Search
USPC .............. 81/469, 475, 474; 74/500.5, 502.3
See application file for complete search history.

(56) References Cited

U.S. PATENT DOCUMENTS

| | | | |
|---|---|---|---|
| 5,082,066 | A | 1/1992 | Schoeps |
| 5,203,242 | A | 4/1993 | Hansson |
| 6,119,562 | A | 9/2000 | Jenkins |
| 7,458,297 | B1 * | 12/2008 | Shiao ................ B25B 23/1425 81/479 |
| 2001/0004940 | A1 | 6/2001 | Hansson |
| 2003/0196497 | A1 * | 10/2003 | Geilenbrugge ......... G01L 3/108 73/862.338 |
| 2006/0124332 | A1 | 6/2006 | Greese et al. |
| 2006/0225519 | A1 | 10/2006 | Nakagawa et al. |
| 2007/0051186 | A1 * | 3/2007 | Gharib ................ B25B 23/1427 73/862.21 |
| 2007/0227316 | A1 | 10/2007 | Lucke et al. |
| 2007/0261868 | A1 | 11/2007 | Gross |
| 2009/0255386 | A1 * | 10/2009 | Liao ................... B25B 23/1427 81/124.5 |
| 2011/0315414 | A1 | 12/2011 | Kuntner et al. |
| 2015/0328756 | A1 | 11/2015 | Ho et al. |
| 2016/0151828 | A1 | 6/2016 | Weyland |
| 2017/0021484 | A1 | 1/2017 | Szewc et al. |
| 2020/0398409 | A1 | 12/2020 | Jenkins |
| 2021/0069879 | A1 | 3/2021 | Jenkins et al. |

FOREIGN PATENT DOCUMENTS

| | | | |
|---|---|---|---|
| CN | 2493358 | | 5/2002 |
| CN | 1843705 | A | 10/2006 |
| CN | 101041234 | A | 9/2007 |
| CN | 103586823 | A | 2/2014 |
| CN | 105643258 | A | 6/2016 |
| CN | 106457492 | A | 2/2017 |
| DE | 3140288 | A1 * | 10/1981 ........... B25B 23/141 |
| DE | 19507097 | A1 | 9/1996 |
| DE | 69118733 | | 11/1996 |
| DE | 19912837 | A1 | 10/2000 |
| DE | 10051011 | A1 | 4/2002 |
| DE | 102004059814 | A1 | 6/2006 |
| DE | 202006008056 | U1 | 8/2006 |
| DE | 102006013147 | A1 | 9/2007 |
| DE | 202007015971 | U1 | 1/2008 |
| DE | 102007059965 | A1 | 6/2009 |
| DE | 60038357 | | 7/2009 |
| DE | 202011050280 | U1 | 9/2011 |
| DE | 102010030410 | A1 | 12/2011 |
| DE | 202014000041 | U1 | 5/2014 |
| EP | 2777883 | A1 | 9/2014 |
| FR | 3010341 | A1 | 3/2015 |
| FR | 3034033 | A1 | 9/2016 |
| TW | M278982 | U | 10/2005 |
| TW | M289822 | U | 4/2006 |

* cited by examiner

TORQUE TOOL

TECHNICAL FIELD

The invention relates to a torque tool to tighten a screw or a similar fastener, which releases at a target torque.

BACKGROUND

Screw connections are the most commonly used connections in mechanical engineering. Such connection elements can only be effective through the use of suitable assembly tools. Assembly tools suitable for this purpose include torque tools like the torque screwdriver.

Torque tools are needed to apply a specific torque on a workpiece. Torque wrenches and torque screwdrivers are commonly known torque tools, for example. There are mechanical and electronic torque tools. In particular, there are indicating torque tools and setting torque tools. Indicating torque tools always show the current torque of a connection. A target torque value is set on setting torque tools. As soon as this torque is reached when tightening a threaded connection, the torque tool signals the user that the target torque has been reached. This can be signaled by an audible click or a noticeable deflection of the tool.

The torque to be transferred when using manually operated tools depends on the physical condition of the user as well as on their subjective sensitivity to force. Torque tools are used to tighten a screw or bolt using a high tightening force that lies within the elastic range of the screw or bolt to ensure the screw is only tightened with a minimal tightening force. The use of new construction materials like magnesium, aluminum, or plastic in lightweight designs in the automobile or aviation industries, for example, is increasing the demand for torque tools as well as the requirements placed on torque tools. Due to these new materials, the number of sensitive threaded connections is increasing. The low tensile strength of these lightweight design materials as compared to steels leads to damaged threads on the threaded connection if tightened too tightly, which then renders these expensive components useless.

A multifunctional pneumatic tool is known from DE 20 2007 015 971 U1. The multifunctional pneumatic tool comprises a base body, on which an operating lever, an inlet connection, and a cylinder are arranged. A rotor with blades is arranged inside the cylinder. The cylinder is connected to the inlet connection through an inlet switch. The inlet switch can be controlled by the operating lever. A rotary shaft of the rotor passes through the cylinder. The tool additionally comprises at least two tool heads with different functions. A connection element is arranged on the rear end of each tool head, and a connection device is arranged on the front end of the base body. The connection element of a given tool head is releasably connected to the connection device on the front end of the base body. The rear end of the connection element is releasably connected to the front end of the rotor. The releasable connection between the connection element arranged on the rear end of the tool head and the front end of the rotor ensures that a torque is transferred to the individual tool heads when the blades rotate.

DE 20 2006 008 056 U1 contains a description of a force transfer device to transfer a torque that is smaller than an adjustable value. The force transfer device described therein is used as a socket wrench.

TW M2789822 discloses a force transfer device with an adjustable torque. The force transfer device comprises a driving means, a sleeve or flange, a wedge element, and a spring. The driving means is connected to the sleeve so that they can be moved and rotated relative to each other. By adjusting the relative axial position of the driving means with respect to the sleeve, it is possible to set the force applied to the spring, and therefore set the maximum torque that can be transferred between the wedge element and the sleeve.

DE 20 2011 050 280 U1 describes an adjustable torque wrench with a tool drive component. The torque tool has a tube-shaped tool shaft in said component, which extends in the longitudinal direction. A handle is arranged on a first end section, which is pivot mounted on the tool shaft and can be rotated around the longitudinal axis of the tool shaft. The handle is directly or indirectly coupled to a tension unit inside the handle. Rotating the handle compresses or releases a spiral spring, and the resulting tension then sets the tightening torque to be applied. The handle also has a folding lever, which lies on the handle when it is in its resting position. A scale is arranged in a transition zone between the tool shaft and the handle which can indicate the current tightening torque setting in numerical form. The transition zone is tapered with respect to the tool shaft, whereby its cross-sectional area is reduced. A second end section of the tool shaft opposite the first end section serves to couple with a tool drive component on which tools can be mounted, generally in the form of shell tools. For this purpose, the second end section of the tool shaft, which otherwise has a circular cross-section, is flattened such that a rectangular opening is formed at the end.

From the German published patent application DE 100 51 011 A1, a setting torque wrench is known in which the torque is measured electronically. Using a strain gauge, the mechanical torque is converted to an electronic signal. The torque measured in this manner is compared to a target value. When the measured torque reaches the target torque value set or defined, the torque wrench is mechanically released at least temporarily by the electronic evaluation unit. The torque wrench is released here by decoupling the wrench handle and the wrench head, for example.

DE 20 2014 00 0041 U1 relates to a setting torque tool, which contains a shaft-like housing with a grip area and a head section. A transfer assembly is provided in the housing to transfer the torque. The torque tool also has an actuating device having an adjusting knob to set the torque at which the user desires the tool to provide a signal. A display shows the value of the torque at which the torque tool should release. The torque tool also has a release mechanism, which triggers the release of the torque tool upon reaching the previously set torque.

From DE 10 2006 013 147 A1 a torque tool for measuring and/or for tightening a torque up to a set torque on a workpiece is known. The torque tool contains a housing with a handle and a head lever to transfer the torque. A measuring element serves to measure the torque electronically, the value of which is processed by an electronic measuring and control system. An activating switch controlled by the electronic measuring and control system releases the torque tool when a target torque value is reached. The torque wrench described therein has a reduction mechanism, which has at least one actuator that is activated by the activating switch. The reduction mechanism is arranged between the lever used to transfer the torque and the electronically controlled activating switch used to release the torque tool. In this document, the description states that the reduction mechanism contains a switching lever with a switching edge that is controlled by the electronically controlled activating switch.

SUMMARY

The task of the invention is therefore to avoid the disadvantages of the current state of the art and provide a setting torque tool with a simple design and which is economical to manufacture. The release effect achieved should be highly effective in this regard, especially for motor-driven torque tools.

This task is achieved with a torque tool for tightening a screw or a similar fastener to a target torque. The torque tool has a main body with a housing, which rotate around a common axis to transfer the torque. A drive shaft is firmly connected to the housing to transfer a torque. A connection area on the drive shaft can be connected to a drive. An adapter for an operating tool is provided on the main body and rotates together with the housing and the drive shaft to transfer the torque. A sensor measures and evaluates the torque transferred. A release mechanism is arranged in the housing and releases upon reaching a target torque. The adapter for the operating tool is pivot-mounted in the housing. The release mechanism contains a locking mechanism, which connects the adapter to the housing to transfer the torque and unlocks when the release mechanism is released to allow the adapter to rotate freely in the housing.

The tool is based on the principle that the drive, regardless of whether it is driven mechanically or manually, does not have any influence on the threaded connection upon reaching a target torque. To achieve this, the drive to transfer a torque is decoupled by unlocking the adapter from the housing transferring the torque. For this purpose, the adapter is pivot-mounted in the housing of the main body and can therefore rotate freely when in the unlocked state. The housing is only coupled with the adapter when locked, so that a torque up to the target torque can be transferred via the housing with the drive shaft. The target torque to be reached can be set using suitable means.

An advantageous embodiment of the torque tool includes an electrically operated actuator, for example an electronically controlled solenoid, which unlocks the locking mechanism upon reaching the target torque. Electrically operated actuators such as solenoids are known components and are easy to manufacture. Furthermore, it is simple to drive and operate the locking mechanism electronically in this manner with a solenoid. A suitable electrical signal is adequate for the purpose of activating the solenoid.

In a preferred and advantageous embodiment of the torque tool, the adapter has a radial hole with at least one locking element, whereby the locking element is pushed out of the hole and into a recess in the housing with the aid of the electrically operated actuator to lock, and whereby the locking element moves in a free space to unlock. This measure makes it easy to realize an electronically controlled locking and unlocking mechanism. The solenoid is suitable for use as an electrically operated actuator. The direction of motion of the solenoid can then be redirected from an axial direction to a radial direction, and the solenoid can thus be arranged in the torque tool to save space.

In a particular and advantageous embodiment of the setting torque tool, the locking element of the locking mechanism is preloaded by a spring element to lock. This measure allows the locking element to be in an elastically locked state. The locking mechanism can only be unlocked by overcoming the spring force of the spring element.

In another advantageous embodiment of the setting torque tool, the free space is formed by an axial hole in the adapter, into which the locking element is moved by means of the electrically operated actuator to unlock the locking mechanism. The solenoid is particularly suitable for use as an electrically operated actuator for this purpose. This measure serves to convert the linear motion of the solenoid in the otherwise rotary locking mechanism system in a suitable manner to a locked or unlocked state. This type of embodiment of the locking mechanism is especially low-wear, and therefore less prone to error.

A preferred variant the setting torque tool is furthermore designed so that a spring-loaded locking body is provided with a free space, whereby the locking element is moved into the free space by means of the electrically operated actuator, such as the solenoid, to unlock the locking mechanism, and the locking body pushes the locking element into the recess of the housing to lock the locking mechanism. This measure is an alternative to having a free space in the adapter. The free space is now located in the locking body instead. The spring-loaded locking body is easy to control when unlocking, for example using the solenoid. Additional free space does not have to be created in the adapter. As a result of this, it is possible to design a quite compact torque tool.

In another advantageous variant of the setting torque tool, the free space is provided in a spring-loaded locking lever. To unlock, the locking lever moves the locking element of the locking mechanism into the free space by means of the electrically operated actuator, such as the solenoid. To lock, the locking lever pushes the locking element into the recess. In this measure as well, the free space for the locking element of the locking mechanism is not located in the adapter or in the main body, but in the locking lever. In the locked state, the spring-loaded locking lever firmly holds the locking element in the recess. The locking element only moves into the free space when the locking lever is swiveled.

Another advantageous alternative of the setting torque tool is obtained in that the free space is formed by a spring-loaded body with a conical tip, which is arranged in an axial channel of the main body, whereby the locking element is moved into the free space by means of the electrically operated actuator, such as the solenoid, to unlock the locking mechanism, and the body with a conical tip pushes the locking element into the recess of the housing to lock the locking mechanism. It is particularly easy and advantageous to manufacture the torque tool with such a locking mechanism. The locking body used can be a cylinder, for example, which has a conical tip section. The free space for unlocking is created between this conical section and the channel. To unlock, it is only necessary to move the cylinder with the conical tip in the direction required to create the free space required to unlock.

The locking element of the locking mechanism is preferably formed as a ball. Balls are standard industrial elements which are also used in ball bearings, for example. This allows the locking mechanism to be manufactured simply and economically. Instead of only one ball, it is naturally also possible to use any number of balls as locking elements. Cylindrical rollers can also be used instead of the balls. In this technical context, they can be assumed to have functions and properties similar to those of the balls.

Another advantageous variant of the torque tool is obtained in that the drive shaft is designed as a torsion bar. The torsion bar deforms elastically when transferring a torque. As a result of this, it is possible to measure the torque based on the degree of deformation.

In a further development of the torque tool, the sensor comprises a strain gauge, which is provided on the torsion bar to measure the torque. The strain gauge measures the deformation of the torsion bar and generates a corresponding signal, which corresponds to the currently applied torque.

Another expedient development of the torque tool is also obtained in that the sensor has an electronic control unit, which controls the electrically operated actuator, for example the solenoid, to actuate the release mechanism. The electronic control unit can be designed as a processor-controlled unit. This simplifies the processing of signals to some extent. The currently applied torque must always be compared to the target torque. As soon as the target torque is reached, the control electronics control the electrically operated actuator, for example the solenoid, of the release mechanism by sending the actuator an electrical pulse, for example.

Another advantageous embodiment of the torque tool is obtained in that the operating tool has a machine drive. A manually operated torque tool may enable a user to get a feel for a torque, but in modern industrial manufacturing, fast processes are necessary to achieve the highest possible productivity. For this reason, this measure serves to increase productivity substantially. The design of the torque tool is also particularly suitable for this purpose.

Additional embodiments and advantages result from the object of the subclaims and from the drawings with the associated descriptions. Exemplary embodiments are explained in more detail with reference to the enclosed drawings. The invention should not be restricted to this list of exemplary embodiments alone. They only serve to explain the invention in more detail.

DETAILED DESCRIPTION

Figure 1:
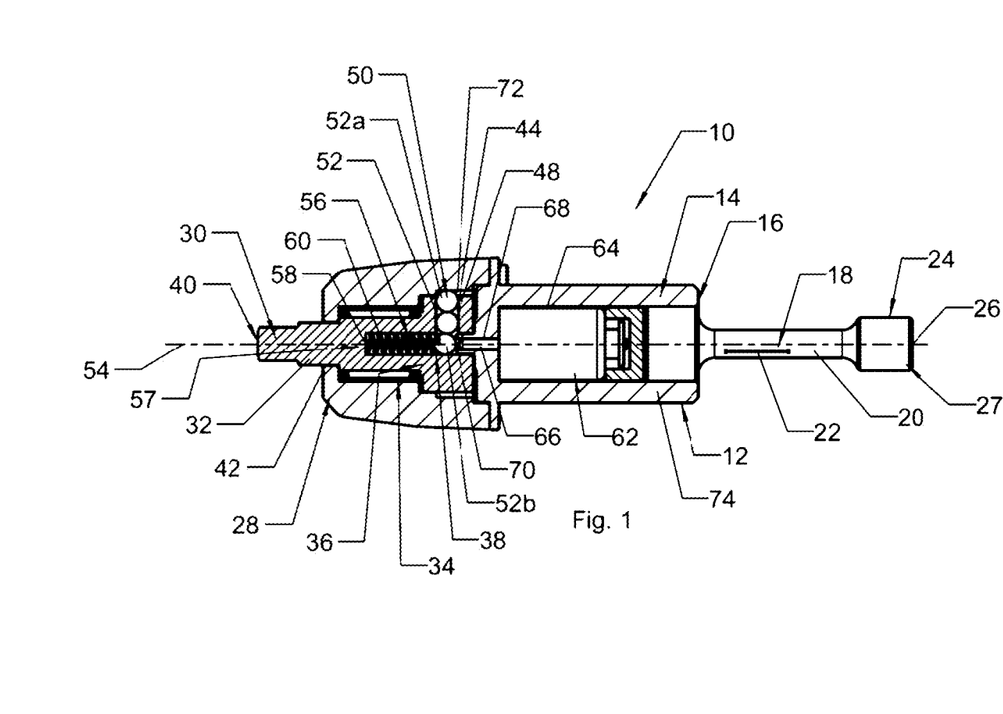
FIG. 1 is a schematic diagram of the longitudinal section along the axis of a torque screwdriver in the locked state.

In FIG. 1 the number 10 designates a torque screwdriver to tighten a screw or similar fastener to a target torque. A longitudinal section of the torque screwdriver 10 is shown in FIG. 1. The torque screwdriver 10 comprises a main body 12 with a housing 14. A drive shaft 18 is attached to a front area 16 of the housing 14. The drive shaft 18 forms a torsion bar 20, which is firmly connected to the housing 14. A strain gauge 22 is arranged on the torsion bar 20 to measure a torque to be applied to a workpiece (not shown in the diagram). On its end 24, the drive shaft 18 has a connection area 27 formed as a recess 26 for a suitable drive tool. The drive tool transfers the torque through the torsion bar 20 to the housing 14.

There is an adapter 30 on one end 28, which is opposite the drive shaft 18, of the housing 14. The adapter 30 can be provided for insert tools or shell tools. The adapter 30 has a shaft 32 arranged axially to the housing 14. The shaft 32 is rotatably mounted in a needle roller bearing 34. A disk 38 is arranged essentially perpendicular to the shaft 32 on an end piece 36 of the shaft 32. The disk 38 is located in the housing 14 of the main body 12. The disk 38 is rigidly connected to the shaft 32 so that the disk 38 always rotates with the shaft 32. Furthermore, one end 40 of the shaft 32 extends out of the housing 14. A retaining ring 42 closes the housing 14 and holds the bearing and part of the shaft 32 in the housing 14. The end 40 extending out of the housing 14 comprises a coupling area, for example to insert or plug in an operating tool (not shown in the diagram). The operating tools are driven by the adapter 30 and through the housing 14 to transfer the torque.

The torque screwdriver 10 has a release mechanism 44, which comprises a locking mechanism 46. The disk 38 of the adapter 30 has a radial hole 48 for this purpose. Locking elements 50 are provided in the radial hole 48. The locking elements 50 in the present exemplary embodiment are steel balls 52, which completely fill the radial hole 48. Other shapes and materials for the locking elements 50 are also certainly conceivable.

Figure 2:
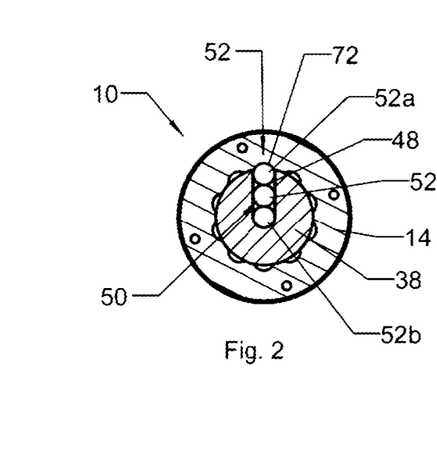
FIG. 2 is a schematic diagram of the cross-section of a torque screwdriver in the locked state according to FIG. 1.

FIG. 2 shows a diagram of the cross-section of the area of the disk 38 of the adapter 30. The steel balls 52 lie in a row in the radial hole 48. The unlocked disk 38 of the adapter 30 is provided rotatably in the housing 14, see FIGS. 3 and 4. The outermost steel ball 52*a* protrudes into an inner recess 72. The same reference signs are used in FIG. 2 wherever they correspond to the reference signs used in FIG. 1.

As shown in FIG. 1, an axial hole 56 intersects the end 57 of the radial hole 48 closest to the axis of rotation 54. The axial hole 56 has the same diameter as the radial hole 48 and is used as a free space 58. Furthermore, a spiral spring 60 is provided as a spring element in the axial hole 56, which pushes the steel balls 52 into the radial hole 48 with its spring force. As a result of this, the steel balls 52 are preloaded in the radial hole 48.

An electrically operated solenoid 62 is arranged in an inner chamber 64 of the housing 14. The solenoid 62 forms an electric actuator. The solenoid 62 has an axial pin 66, which passes through an axial hole 68 in the chamber 64. The axial hole 68 ends in an axial end opening 70 of the radial hole 48. The diameter of the pin 66 as well as the diameter of the axial end opening 70 is smaller than the diameter of the steel balls 52. The steel balls 52 therefore cannot pass through the axial end opening 70.

In the exemplary embodiment shown in FIGS. 1 and 2, the torque screwdriver 10 used to transfer a torque is depicted in a locked state. The outermost steel ball 52*a* protrudes into an inner recess 72 of the housing 14 for this purpose. As soon as the drive shaft 18 is driven by the drive tool, the housing 14 rotates together with the adapter 30 due to the lock. The adapter 30, when firmly attached in this manner to the housing 14, thus transfers the torque to a threaded connection.

Due to the torsion of the torsion bar 20 when transferring a torque to a threaded connection, the strain gauge 22 supplies a signal, which corresponds to the current torque, to the sensor 74. The sensor 74 is a processor-based electronic control system, for example, which first digitizes the analog signals of the strain gauge 22 using an analog-to-digital converter and then processes them digitally. These control electronics contain a digital memory to preset and store a target torque. The control electronics can be arranged internally in or on the main body 12 of the torque screwdriver 10 or externally. In the case of external control electronics, the capabilities for exchanging signals known to the expert must be created. The control electronics evaluate the applied torque, in particular by comparing the applied torque to the target torque. Upon reaching the target torque, the control electronics actuates the solenoid 62 to release.

Figure 3:
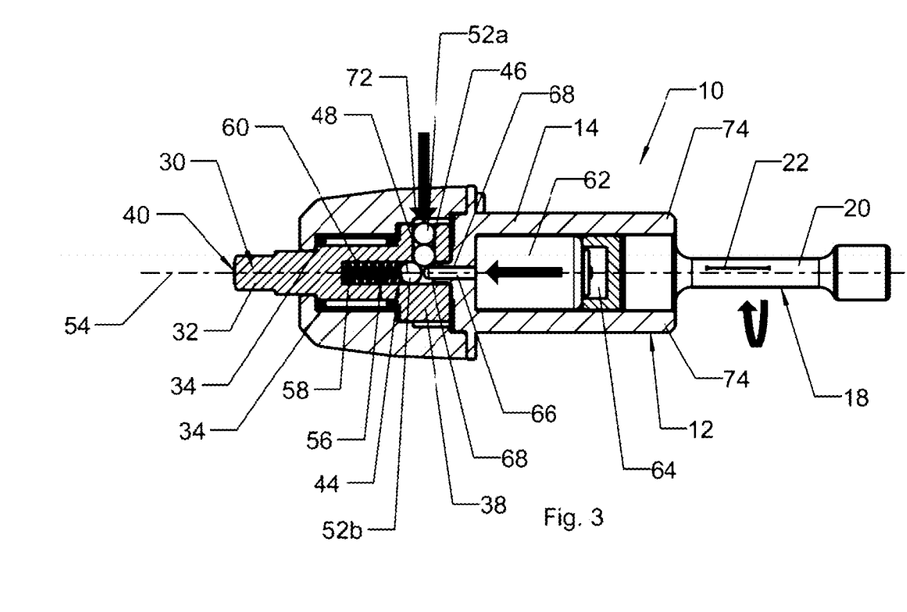
FIG. 3 is a schematic diagram of the longitudinal section along the axis of a torque screwdriver in the unlocked state.
Figure 4:
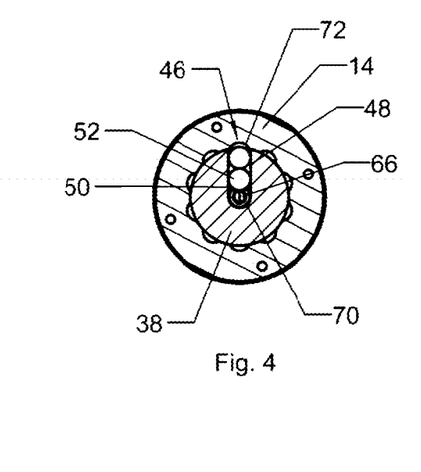
FIG. 4 is a schematic diagram of the cross-section of a torque screwdriver in the unlocked state according to FIG. 3.

FIGS. 3 and 4 show the torque screwdriver 10 in a released state. FIG. 3 corresponds to the longitudinal section in FIG. 1, and FIG. 4 corresponds to the cross-section in the area of the disk 38 in FIG. 2. Wherever the two figures correspond, the same reference signs are used.

As soon as a threshold value for a set target torque is reached, the torque screwdriver 10 releases, as shown in FIGS. 3 and 4. To achieve this, the control electronics activate the solenoid 62, whose pin 66 pushes through the hole 68 and the axial end opening 70 and into the radial hole 48. In doing so, the pin 66 of the solenoid pushes a steel ball 52*b* of the locking elements 50 against the spring force the spiral spring 60 into the free space 58 in the axial hole 56 of the shaft 32. The steel balls 52 can slide, so that the outermost steel ball 52*a* slides out of the inner recess 72 of the housing 14 and releases the lock. In this unlocked state, the adapter 30 can rotate freely in the needle roller bearing 34. The torque is not transferred from the main body 12 to the adapter 30 anymore.

To lock, the solenoid 62 returns to its initial locking position. This enables the spiral spring 60 to push the steel ball 52*b* out of the axial hole 56 of the shaft 32 and back into the radial hole 48. As a result of this, the outer steel ball 52*a* moves back into the inner recess 72 of the housing 14 to lock.

Figure 5:
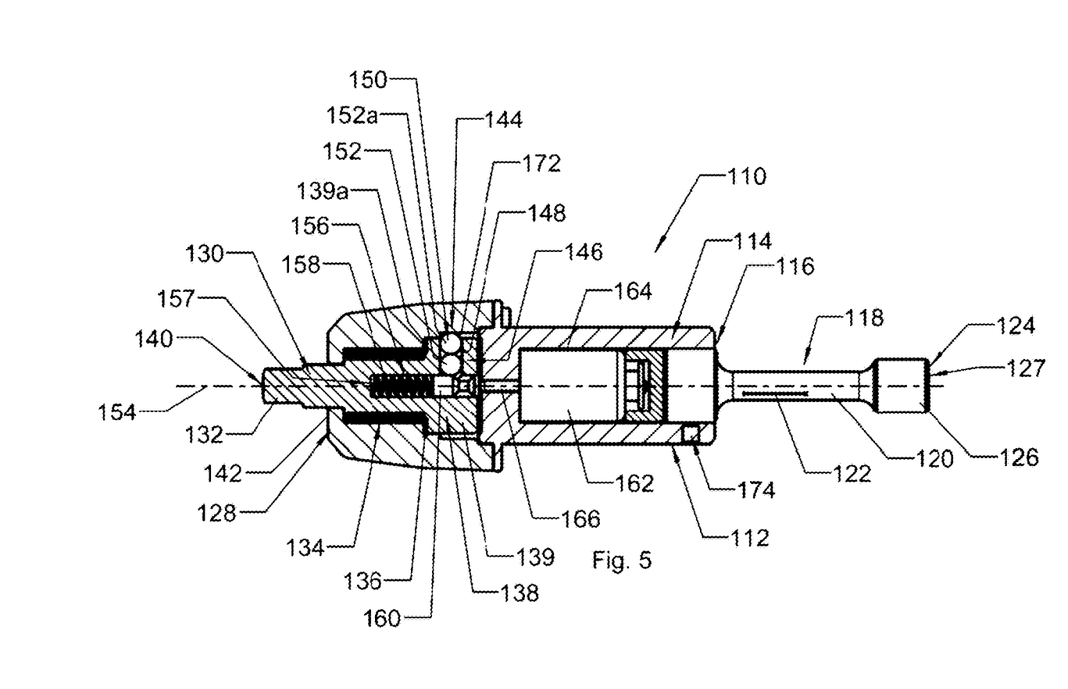
FIG. 5 is a schematic diagram of the longitudinal section along the axis of another exemplary embodiment of a torque tool in the locked state.

In FIG. 5 the number 110 designates a torque tool to tighten a screw or similar fastener to a target torque. A longitudinal section of the torque tool 110 is shown in FIG. 5. The torque tool 110 comprises a main body 112 with a housing body 114. A drive shaft 118 is attached to a front area 116 of the housing body 114. The drive shaft 118 forms a torsion bar 120, which is firmly connected to the housing body 114. A strain gauge 122 is arranged on the torsion bar 120 to measure a torque to be applied to a workpiece (not shown in the diagram). On its end 124, the drive shaft 118 has a connection area 127 formed as a recess 126 for a suitable drive tool. The drive tool transfers the torque through the torsion bar 120 to the housing body 114.

There is an adapter 130 on one end 128, which is opposite the drive shaft 118, of the housing body 114. The adapter 130 can be provided for insert tools or shell tools. The adapter 130 has a shaft 132 arranged axially to the housing body 114. The shaft 132 is rotatably mounted in a needle roller bearing 134. A disk 138 is arranged essentially perpendicular to the shaft 132 on an end piece 136 of the shaft 132. The disk 138 consists here of a cylindrical body 139, a flat side 139*a* of which is fastened centrally to the shaft 132. The disk 138 is located in the housing 114 of the main body 112. The disk 138 is rigidly connected to the shaft 132 so that the disk 138 always rotates with the shaft 132. Furthermore, one end 140 of the shaft 132 extends out of the housing body 114. A retaining ring 142 closes the housing body 114 and holds the needle roller bearing 134 and part of the shaft 132 in the housing body 114. The end 140 of the shaft 132 extending out of the housing body 114 comprises a coupling area, for example to insert or plug in an operating tool (not shown in the diagram). The operating tools are driven by the adapter 130 and through the housing body 114 to transfer the torque.

The torque tool 110 has a release mechanism 144, which comprises a locking mechanism 146. The disk 138 of the adapter 130 has a radial hole 148 for this purpose. Locking elements 150 are provided in the radial hole 148. The locking elements 150 in the present exemplary embodiment are steel balls 152, which completely fill the radial hole 148. Other shapes and materials for the locking elements 150 are also certainly conceivable.

Figure 6:
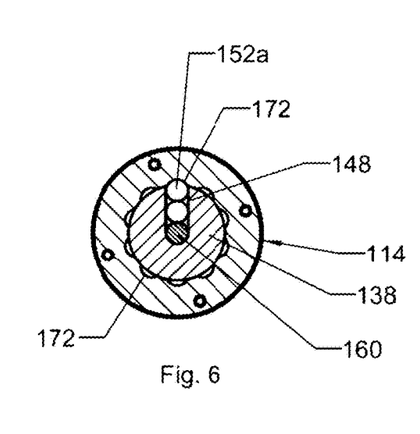
FIG. 6 is a schematic diagram of the cross-section of a torque tool in the locked state according to FIG. 5.

FIG. 6 shows a diagram of the cross-section of the area of the disk 138 of the adapter 130. The steel balls 152 lie in a row in the radial hole 148. The unlocked disk 138 of the adapter 130 is provided rotatably in the housing body 114, see FIGS. 7 and 8. The outermost steel ball 152*a* protrudes into an inner recess 172. The same reference signs are used in FIG. 6 wherever they correspond to the reference signs used in FIG. 5.

As shown again in FIG. 5, an axial hole 156 intersects the end 157 of the radial hole 148 closest to the axis of rotation 154. A spiral spring 158 is provided as a spring element in the axial hole 156, which pushes a locking body 160 against a plunger 166 of an electrically operated solenoid 162. As a result of this, the steel balls 152 are located in the radial hole 148, as shown, in a locking position. The locking body 160 is formed such that the steel balls 152 are pressed outwards radially so that the outermost steel ball 152*a* protrudes into the inner recess 172 of the housing body 114 to lock. The solenoid 162 forms an electric actuator.

The solenoid 162 is arranged in an inner chamber 164 of the housing body 114. The solenoid 162 contains the axial plunger 166, against which the locking body 160 of the spiral spring 158 is pressed.

In the exemplary embodiment shown in FIGS. 5 and 6, the torque tool 110 used to transfer a torque is depicted in a locked state. The outermost steel ball 152*a* protrudes into an inner recess 172 of the housing body 114 for this purpose. As soon as the drive shaft 118 is driven by the drive, the housing body 114 rotates together with the adapter 130 due to the lock. The adapter 130, when firmly attached in this manner to the housing body 114, thus transfers the torque to a threaded connection.

Due to the torsion of the torsion bar 120 when transferring a torque to a threaded connection, the strain gauge 122 supplies a signal, which corresponds to the current torque, to the sensor 174. The sensor 174 is a processor-based electronic control system, for example, which first digitizes the analog signals of the strain gauge 122 using an analog-todigital converter and then processes them digitally. These control electronics contain a digital memory to preset and store a target torque. The control electronics can be arranged internally in or on the main body 112 of the torque tool 110 or externally. In the case of external control electronics, the capabilities for exchanging signals known to the expert must be created. The control electronics evaluate the applied torque, in particular by comparing the applied torque to the target torque. Upon reaching the target torque, the control electronics actuates the solenoid 162 to release.

Figure 7:
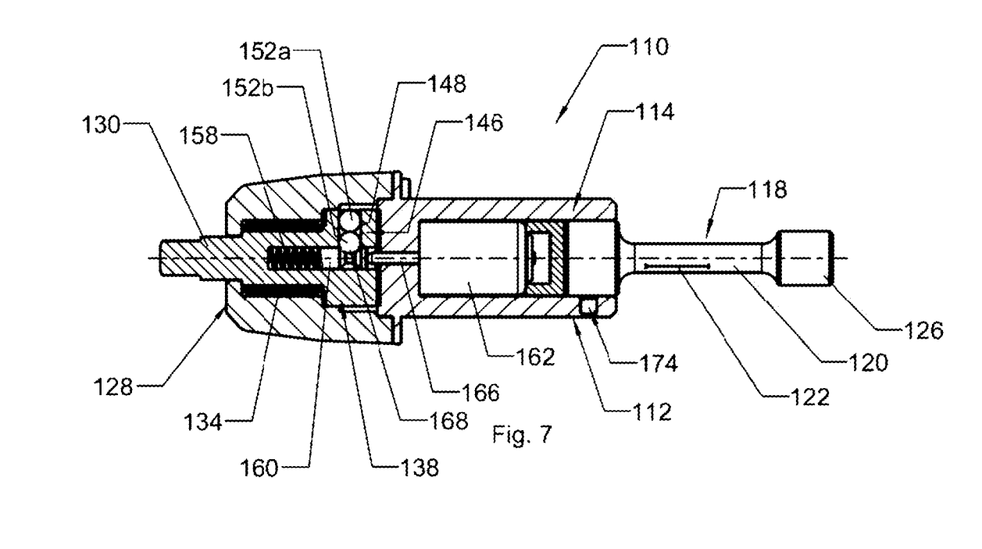
FIG. 7 is a schematic diagram of the longitudinal section along the axis of the torque tool and according to FIGS. 5 and 6 in the unlocked state.
Figure 8:
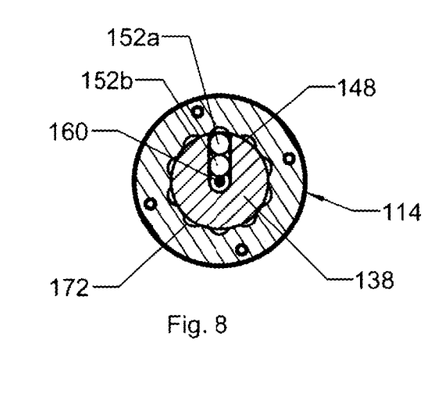
FIG. 8 is a schematic diagram of the cross-section of the torque tool in the unlocked state according to FIGS. 5 and 7.

FIGS. 7 and 8 show the torque tool 110 in an unlocked or released state. FIG. 7 corresponds to the longitudinal section in FIG. 5, and FIG. 8 corresponds to the cross-section in the area of the disk 138 in FIG. 6. Wherever the two figures correspond, the same reference signs are used.

As soon as a threshold value for a set target torque is reached, the torque tool 110 releases, as shown in FIGS. 5 and 6. For this purpose, the control electronics activate the solenoid 162, whose plunger 166 pushes the locking body 160 against the spring force of the spiral spring 158. In doing so, steel ball 152b of the locking elements 150 moves into a free space 168 of the locking body 160. The other steel balls 152 can slide, so that the outermost steel ball 152a slides out of the inner recess 172 of the housing body 114 and unlocks the locking mechanism 146 to release. In this unlocked state, the adapter 130 can rotate freely in the needle roller bearing 134. The torque is not transferred from the main body 112 to the adapter 130 anymore.

To lock, the solenoid 162 returns with its plunger 166 to its initial locking position. This presses the spiral spring 158 of the locking body 160 back into its locking position, as shown in FIGS. 5 and 6. The steel ball 152b is pushed out of the free space 168 of the locking body 160 and back into the radial hole 148. As a result of this, the outer steel ball 152a moves back into the inner recess 172 of the housing body 114 to lock.

Figure 9:
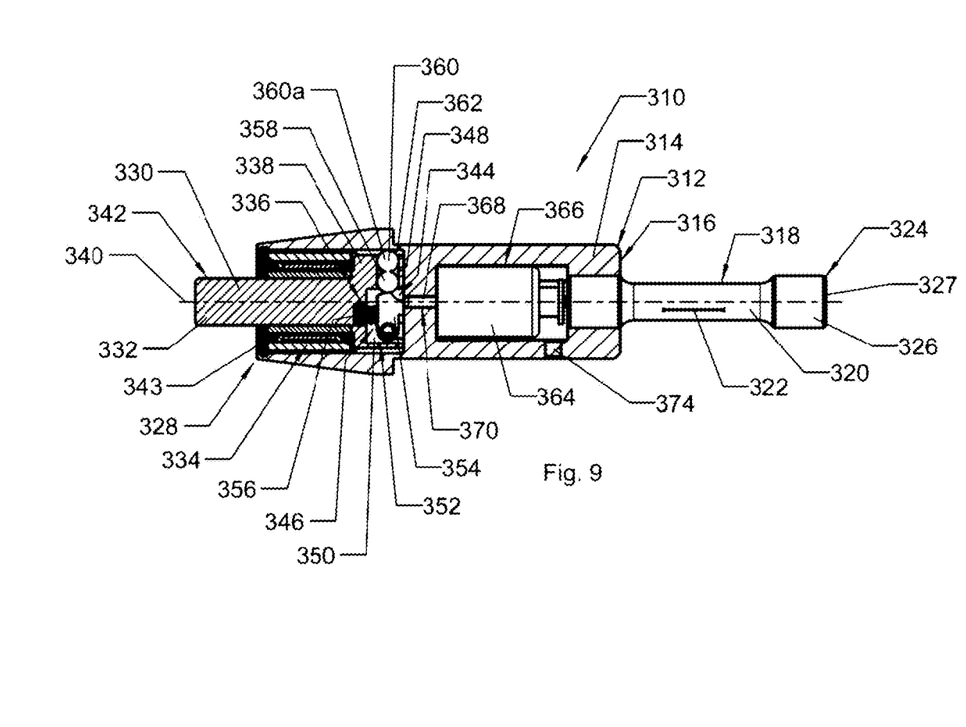
FIG. 9 is a schematic diagram of the longitudinal section along the axis of a third exemplary embodiment of a torque tool in the locked state.

FIG. 9 shows another exemplary embodiment of a torque tool 310 to tighten a screw or similar fastener to a target torque. A longitudinal section of the torque tool 310 is shown in FIG. 9. The torque tool 310 comprises a main body 312 with a housing body 314. A drive shaft 318 is attached to a front area 316 of the housing 314. The drive shaft 318 forms a torsion bar 320, which is firmly connected to the housing 314. A strain gauge 322 is arranged on the torsion bar 320 to measure a torque to be applied to a workpiece (not shown in the diagram). On its end 324, the drive shaft 318 has a connection area 327 formed as a recess 326 for a suitable drive tool. The drive tool transfers the torque through the torsion bar 320 to the housing 314

There is an adapter 330 on one end 328, which is opposite the drive shaft 318, of the housing 314. The adapter 330 can be provided for insert tools or shell tools. The adapter 330 has a shaft 332 arranged axially to the main body 312. The shaft 332 is rotatably mounted in a rolling bearing or a needle roller bearing 334.

A disk section 338 is arranged essentially perpendicular to the shaft 332 on an end piece 336 of the shaft 332. The disk section 338 is located in the housing 314 and extends in this cross-sectional view above the axis of rotation 340 of the main body 312. The disk section 338 is rigidly connected to the shaft 332 so that the disk section 338 always rotates with the shaft 332. Furthermore, one end 342 of the shaft 332 extends out of the housing 314. A retaining ring 343 closes the housing 314 and holds the bearing and part of the shaft 332 in the housing 314. The end 342 extending out of the housing 314 comprises a coupling area, for example to insert or plug in an operating tool (not shown in the diagram). The operating tools are driven by the adapter 330 and through the housing body 314 or the main body 312 to transfer the torque.

The torque tool 310 has a release mechanism 344, which comprises a locking mechanism 346. The disk section 338 of the adapter 330 has a radial hole 348 for this purpose. A locking lever chamber 352 is located on a radially opposing side 350 of the disk section 338.

A hammer-shaped locking lever 354, which is swivably arranged on one of its outer ends, is provided in this locking lever chamber 352. The locking lever 354 is preloaded by a spring 356 as a spring element. The locking lever 354 can also be manufactured from an elastic metal or plastic with sufficient hardness, and thus eliminate the need for the separate spring 356. The spring 356 swivels the locking lever 354 due to its spring force around its pivot axis to a locking position. The locking lever 354 thus presses locking elements 358 into the radial hole 348. The locking elements 358 in the present exemplary embodiment are steel balls 360, which completely fill the radial hole 348. Other shapes and materials for the locking elements 358 are also certainly conceivable.

Figure 10:
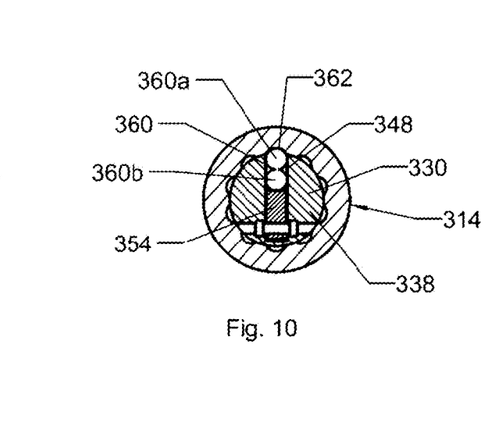
FIG. 10 is a schematic diagram of the cross-section of a torque tool in the locked state according to FIG. 9.

FIG. 10 shows a diagram of the cross-section of the area of the disk section 338 of the adapter 330. The steel balls 360 are positioned in a row in the radial hole 348. The unlocked disk section 338 of the adapter 330 is provided rotatably in the housing 314, analogous to the previous exemplary embodiments. The outermost steel ball 360a protrudes into an inner recess 362. The same reference signs are used in FIG. 10 wherever they correspond to the reference signs used in FIG. 9.

As FIG. 9 again shows, an electrically operated solenoid 364 is arranged in an inner chamber 366 of the housing 314. The solenoid 364 has an axial pin 368, which passes through an axial hole 370 in the chamber 366. The solenoid 364 forms an electric actuator.

In the exemplary embodiment shown in FIGS. 9 and 10, the torque tool 310 used to transfer a torque is depicted in a locked state. The outermost steel ball 360a protrudes into an inner recess 362 of the housing 314 for this purpose. As soon as the drive shaft 318 is driven by the drive tool, the housing 314 rotates together with the adapter 330 due to the lock. The adapter 330, when firmly attached in this manner to the housing 314 or to the main body 312, thus transfers the torque to a threaded connection.

Due to the torsion of the torsion bar 320 when transferring a torque to a threaded connection, the strain gauge 322 supplies a signal, which corresponds to the current torque, to the sensor 374. The sensor 374 is a processor-based electronic control system, for example, which first digitizes the analog signals of the strain gauge 322 using an analog-to-digital converter and then processes them digitally. These control electronics contain a digital memory to preset and store a target torque. The control electronics can be arranged internally in or on the main body 312 of the torque tool 310 or externally. In the case of external control electronics, the capabilities for exchanging signals known to the expert must be created. The control electronics evaluate the applied torque, in particular by comparing the applied torque to the target torque. Upon reaching the target torque, the control electronics actuates the solenoid 364 to release.

Figure 11:
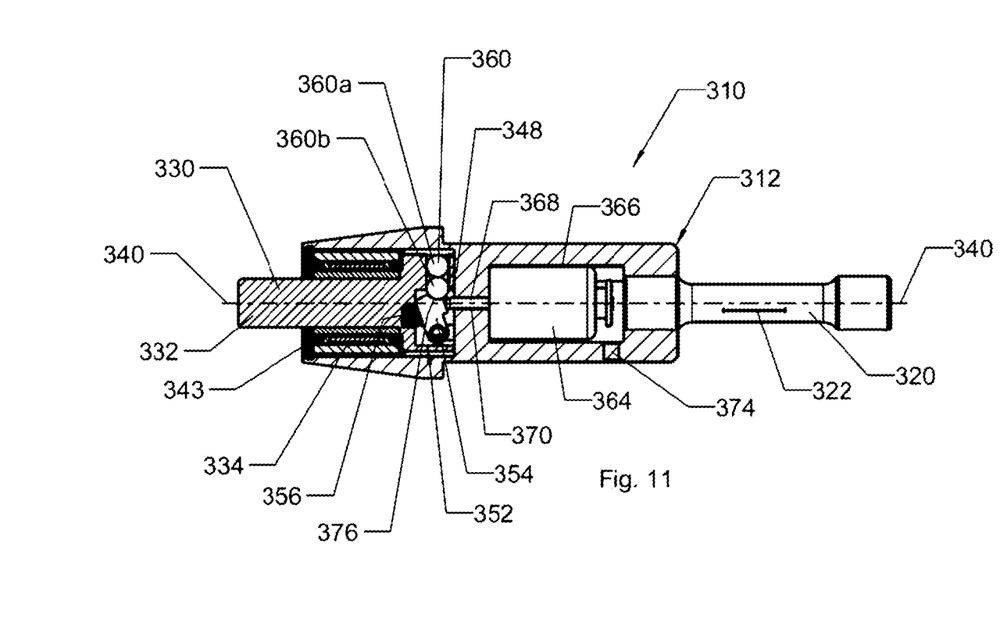
FIG. 11 is a schematic diagram of the longitudinal section along the axis of the torque tool and according to FIGS. 9 and 10 in the unlocked state.
Figure 12:
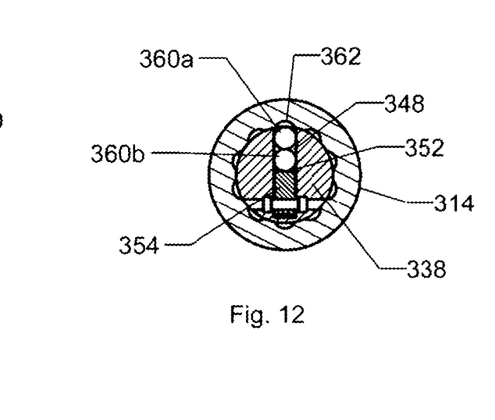
FIG. 12 is schematic diagram of the cross-section of the torque tool in the unlocked state according to FIGS. 9 to 11.

In FIGS. 11 and 12, the torque tool according to FIGS. 9 and 10 is shown in the released or unlocked state. FIG. 11 shows a longitudinal section along the axis of a torque tool 310 in the unlocked or released state. FIG. 12 shows a corresponding diagram of the cross-section. The same reference signs are used in FIGS. 11 and 12 wherever they correspond to the reference signs used in FIGS. 9 and 10.

To release, the solenoid 364 moves its axial pin 368 and swivels the hammer-shaped locking lever 354, as can be seen in FIGS. 11 and 12, against the spring force of the spring 356. This causes the locking lever 354 to uncover the radial hole 348, so that the innermost or, in this case, the lowest steel ball 360b can move into a free space 376. The free space 376 is formed by a notch in the locking lever 354. The other steel balls 362 and the outermost steel ball 360a roll inward in the direction of the axis of rotation 340 and release the lock of the locking mechanism 346. Torque is not transferred to the adapter 330 anymore in this released state.

To lock, the axial pin 368 of the solenoid 364 is retracted. The hammer-shaped locking lever 354 pushes the innermost steel ball 360b back into the radial hole 348 with the spring force of the spring 356. This also causes the other steel balls 360, especially the outermost steel ball 360a, to move into the locking position. The outermost steel ball 360a is pushed again into one of the inner recesses 362 to lock, as shown in FIGS. 9 and 10.

Figure 13:
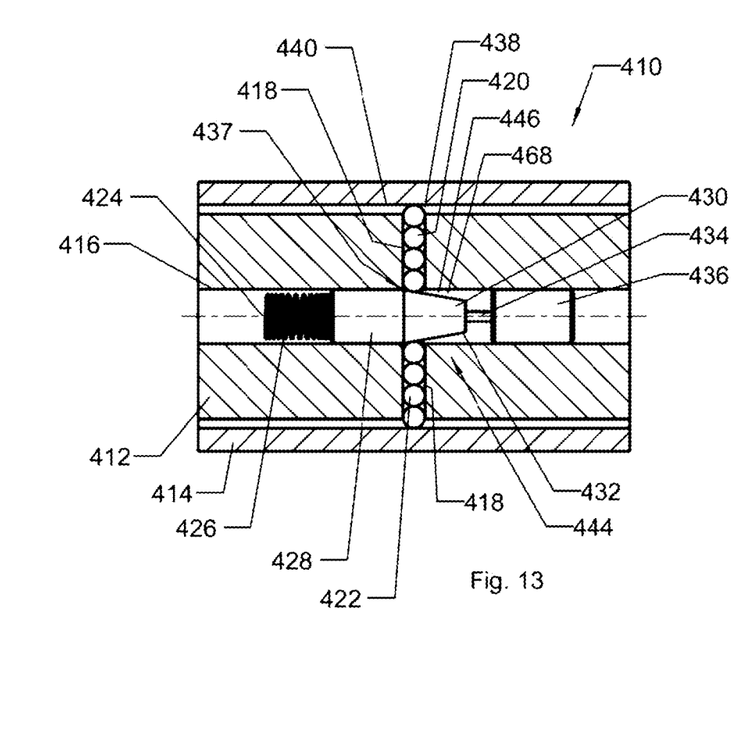
FIG. 13 is schematic diagram of the longitudinal section along the axis of a fourth exemplary embodiment of a torque tool in the locked state.

FIG. 13 shows a longitudinal section along the axis of another variant of a torque tool 410. This figure only shows an excerpt of a longitudinal section of the torque tool 410 with a release mechanism 444 and its locking mechanism 446. The torque tool 410 comprises a cylindrical main body 412 with a cylindrical housing shell 414. A round axial channel 416 is located in the cylindrical main body 412. Two radial holes 418 extend out the channel 416, which are shown here diametrically opposed to each other. Locking elements 420, which are formed as steel balls 422, are located the radial holes 418.

There is also a stop 424 in the channel 416. A spiral spring 426 is arranged between the stop 424 and a cylinder 428. The other end of the cylinder 428 has a conical tip 430. The cylinder 428 with its conical tip 430 is axially movable in the channel 416. The conical tip 430 is truncated on its tapered end 432. The truncated end 432 is pressed by the spring force of the spiral spring 426 against a pin 434 of an electronic solenoid 436.

The cylinder 428 with its conical tip 430 is located in the area of openings 437 of the radial holes 418. In the locked state the locking elements 420 are pressed into the radial holes 418 by the cylinder 428. Numerous recesses 438 are provided circularly on the inner surface 440 of the housing shell 414, as can be seen in the cross-sectional view shown in FIG. 14. The outermost locking element 420a of each of the two radial holes 418 is thus pushed into one of the inner recesses 438 of the housing shell 414. This couples the main body 412 to the cylindrical housing shell 414. As soon as the housing shell 414 is rotated axially in this locked state to transfer a torque, the cylindrical main body 412 moves with the housing shell 414. An adapter (not shown in the diagram), for example, can be fastened to the main body 412, as described in the previous variants. A coupling area for operating tools, for example, can also be provided on this adapter. In the locked state, a torque can then be transferred to bolts via the coupling area.

Figure 14:
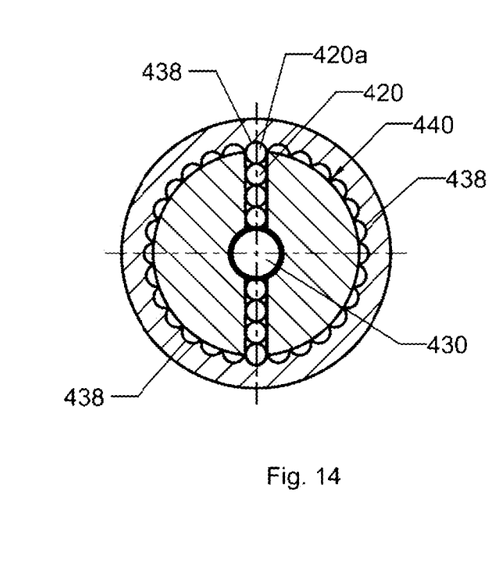
FIG. 14 is schematic diagram of the cross-section of a torque tool in the locked state according to FIG. 13.

FIG. 14 shows a cross-section of the torque tool 410 in the area the radial holes 418 according to FIG. 13. Wherever the components in the two figures correspond, the same reference signs are used. Locking elements 420 are provided in the radial holes 418. The outer locking elements 420a engage the recesses 438 in the inner surface 440 of the housing shell 414. The cylinder 428 pushes the locking elements 420 completely into the radial holes 418. The torque tool is therefore locked. The housing shell 414 is driven to transfer a torque. Due to the locked coupling of the housing shell 414 to the main body 412, the main body 412 rotates synchronously with the housing shell 414.

When transferring a torque via a torsion bar, for example, the strain gauge 22 supplies a signal, which corresponds to the current torque, to the sensor. The sensor evaluates the applied torque, in particular by comparing the applied torque to the target torque. Upon reaching the target torque, the sensor actuates the solenoid 436 to release.

The pin 434 of the solenoid 436 then pushes the cylinder 428 into the channel 416 against the spring force of the spiral spring 426. The locking elements 420 then contact the tapered part of the conical tip 430, which forms a free space 468 in the channel 416 for a locking element. The locking elements 420 then slide through the radial holes 418, so that the outermost locking elements 420a move out of the recesses 438 on the inner surface 440 of the housing shell 414. This decouples the housing shell 414 and the main body 412. The main body 412 can now rotate freely around the axis of rotation. To lock, the pin 434 of the solenoid 436 is retracted to its initial locking position. For this purpose, the cylinder 428 pushes the locking elements 420 into the locking position with the spring force of the spiral spring 426, so that the main body 412 is coupled again to the housing shell 414.

Figure 15:
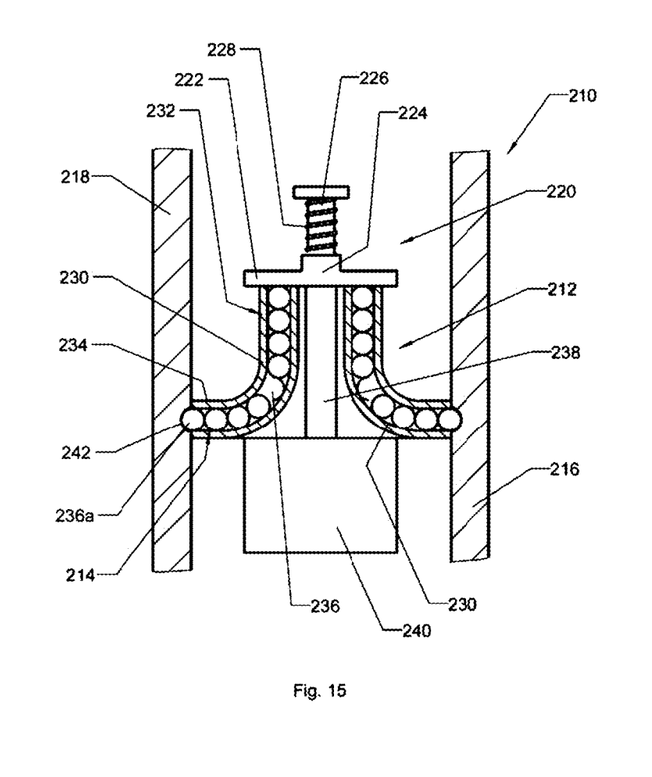
FIG. 15 is a longitudinal section of a fifth exemplary embodiment of a release mechanism for a torque tool in the locked state.

FIG. 15 shows a schematic diagram of another exemplary embodiment of a torque tool 210 with a release mechanism 212. Only an excerpt of a cross-section of the torque tool 210 in the area of the release mechanism 212 is shown. The release mechanism 212 with a locking mechanism 214 is shown in the locked state in this figure. The number 216 designates a housing of the torque tool 210. The housing 216 in this exemplary embodiment also forms a drive body 218 to transfer a torque to a main body 220. The main body 220 contains the locking mechanism 214. This locking mechanism 214 comprises a flat closure disk 222. The flat closure disk 222 comprises a punch-like body 224, on whose shaft 226 a spring 228 is provided, which preloads the closure disk 222 in the axial direction of the main body 220.

The present drawing shows a curved deflection tube 230 below the closure disk 222. This deflection tube 230 curves at a 90° angle, transitioning from an axial direction 232 to a radial direction 234. There are locking elements 236 in the curved deflection tube 230. The locking elements 236 are balls.

A plunger 238 of an electronic solenoid 240 presses against the closure disk 222. In the locked state of the release mechanism 212, the locking elements 236 are pressed into the deflection tubes 230 by the closure disk 222 due to the tension of the spring 228. Each of the outermost locking elements 236a is moved into a locking recess 242 to lock, as shown in FIG. 15. In the locked state, the drive body 218 and the main body 220 always rotate around the same axis of rotation to transfer a torque.

This variant of the torque tool 210 is an electronic torque tool and, like the exemplary embodiments described before, has suitable control electronics with sensor logic. A target torque is stored in the control electronics and compared to the current torque applied. The applied torque is measured for this purpose, for example with a strain gauge on a torsion bar. The sensor supplies the value of the applied torque to the control electronics, which acts as a signaling device upon reaching the target torque and controls and activates the solenoid 240 to release the torque tool 210.

Figure 16:
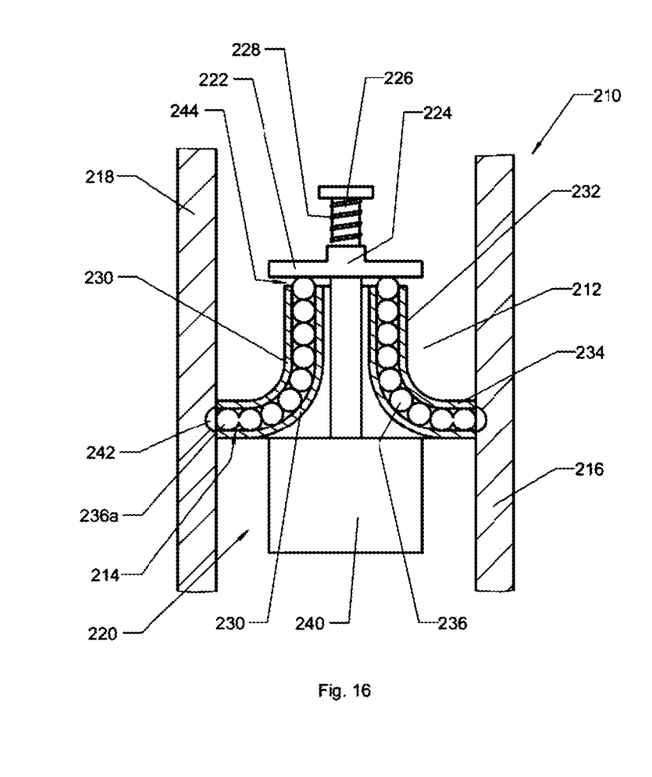
FIG. 16 is a schematic diagram of the longitudinal section along the axis of a release mechanism and according to FIG. 15 for a torque tool in the unlocked state.

FIG. 16 shows a schematic diagram of the exemplary embodiment according to FIG. 15 of a torque tool 210 with the release mechanism 212. The release mechanism 212 with a locking mechanism 214 is shown in the unlocked state in this figure. The same reference signs are used in FIG. 16 wherever they correspond to the reference signs used in FIG. 15.

The housing 216 forms the drive body 218 to transfer a torque to the main body 220. The main body 220 contains the locking mechanism 214. This locking mechanism 214 comprises the flat closure disk 222. The closure disk 222 is spring-loaded by the spring 228.

The plunger 238 of the solenoid 240 presses against the closure disk 222 when the torque tool 210 is released. In the unlocked state of the release mechanism 212 shown here, the closure disk 222 is moved away from the ends of the curved deflection tubes 230. As a result of this, a free space 244 is formed into which locking elements 236 can move. The locking recess 242 is empty due to this movement. The main body 220 and the drive body 218 are therefore not coupled to each other anymore. In this released and unlocked state, the drive body 218 therefore cannot transfer torque to the main body 220. The main body 220 can now rotate freely in the housing 216.

LIST OF REFERENCE SIGNS

10 Torque screwdriver
12 Main body
14 Housing
16 Front area of the housing
18 Drive shaft
20 Torsion bar
22 Strain gauge
24 End of the drive shaft
26 Recess
27 Connection area
28 End of the housing
30 Adapter
32 Shaft
34 Needle roller bearing
36 End piece of the shaft
38 Disk
40 End of the shaft outside the housing
42 Retaining ring
44 Release mechanism
46 Locking mechanism
48 Radial hole
50 Locking elements
52 Steel balls
52a Outermost steel ball
52b Steel ball
54 Axis of rotation
56 Axial hole
57 End of the radial hole
58 Free space
60 Spiral spring
62 Solenoid
64 Chamber
66 Pin
68 Hole
70 Axial end opening
72 Inner recess
74 Sensor
110 Torque tool
112 Main body
114 Housing body
116 Front area of the housing body
118 Drive shaft
120 Torsion bar
122 Strain gauge
124 End of the drive shaft
126 Recess
127 Connection area
128 End of the housing body
130 Adapter
132 Shaft
134 Needle roller bearing
136 End piece
138 Disk
139 Cylindrical body
139a Flat side of the cylindrical body
140 End of the shaft outside the housing body
142 Retaining ring
144 Release mechanism
146 Locking mechanism
148 Hole
150 Locking elements
152 Steel balls
152a Outermost steel ball
152b Steel ball
154 Axis of rotation
156 Axial hole
157 End of the radial hole
158 Spiral spring
160 Locking body
162 Solenoid
164 Chamber for the solenoid
166 Plunger
168 Free space of the locking body
172 Inner recess
174 Sensor
310 Torque tool
312 Main body
314 Housing
316 Front area of the housing
318 Drive shaft
320 Torsion bar
322 Strain gauge
324 End of the drive shaft
326 Recess
327 Connection area
328 End of the housing
330 Adapter
332 Shaft
334 Needle roller bearing
336 End piece of the shaft
338 Disk section
340 Axis of rotation
342 Projecting end of the shaft wave
343 Retaining ring
344 Release mechanism
346 Locking mechanism
348 Radial hole
350 Opposite side
352 Locking lever chamber
354 Hammer-shaped locking lever
356 Spring
358 Locking elements
360 Steel balls
360a Outermost steel ball
360b Lowest steel ball
362 Inner recesses
364 Solenoid
366 Inner chamber
368 Axial pin of the solenoid
370 Axial hole 374 Sensor
376 Free space
410 Torque tool
412 Cylindrical main body
414 Cylindrical housing shell
416 Round channel
418 Radial holes
420 Locking elements
420a Outermost locking element
422 Steel balls
424 Stop
426 Spiral spring
428 Cylinder
430 Conical tip
432 Truncated end
434 Pin of the solenoid
436 Electronic solenoid
437 Openings
438 Recesses
440 Inner surface of housing shell
444 Release mechanism
446 Locking mechanism
468 Free space
210 Torque tool
212 Release mechanism
214 Locking mechanism
216 Housing
218 Drive body
220 Main body
222 Closure disk
224 Punch-like body
226 Shaft
228 Spring
230 Deflection tube
232 Axial direction
234 Radial direction
236 Locking elements
236a Outermost locking element
238 Plunger
240 Solenoid
242 Locking recess
244 Free space

The invention claimed is:

1. A torque tool (10, 110, 310, 410) which releases at a target torque for tightening screws and similar fasteners, comprising:
a main body (12, 112, 312, 412) with a housing (14, 114, 314, 414) which rotate around a common axis to transfer a torque;
a drive shaft (18, 118, 218, 318) firmly connected with the housing (14, 114, 314, 414) to transfer the torque;
a connection area (27, 127, 327) on the drive shaft (18, 118, 318) configured to connect to a drive;
an adapter (30, 130, 330) for an operating tool, which is provided on the main body (12, 112, 312, 412) and rotates together with the housing (14, 114, 314, 414) and the drive shaft (18, 118, 318) to transfer the torque;
a sensor (74, 174, 374) to measure and evaluate the torque transferred; and
a release mechanism (44, 144, 344, 444) which is arranged in the housing (14, 114, 314, 414) and which releases upon reaching a target torque,
wherein the adapter (30, 130, 330) for the operating tool is pivot-mounted in the housing (14, 114, 314, 414), and
wherein the release mechanism (44, 144, 344, 444) contains a locking mechanism (46, 146, 346, 446), which connects the adapter (30, 130, 330) to the housing (14, 114, 314, 414) to transfer the torque and unlock when the release mechanism (44, 144, 344, 444) is released to allow said adapter to rotate freely in the housing (14, 114, 314, 414), and
wherein an electrically operated actuator (62, 162, 364, 436) is arranged in the housing (14, 114, 314, 414) and configured to unlock the locking mechanism (46, 146, 346, 446) upon reaching the target torque, and
wherein the adapter (30, 130) has a radial hole (48, 148, 348, 418) with a locking element (50, 150, 358, 420),
wherein the locking element (50, 150, 358, 420) is pushed out of the radial hole (48, 148, 348, 418) and into a recess (72, 172, 438) in the housing (14) by the electrically operated actuator (62, 162, 364, 436) to lock, and
wherein the locking element (50, 150, 358, 420) moves in a free space (58, 168, 376) to unlock, and
wherein the locking element of the locking mechanism comprises
an outer steel ball which protrudes into an inner recess of the housing when the locking mechanism is locked, and
an inner steel ball which is pushed out of a free space by a plunger that is moved by the electrically operated actuator, and
wherein a center of the outer steel ball and a center of the inner steel ball are arranged in a plane perpendicular to the common axis.

2. The torque tool as in claim 1, wherein the locking element (50, 150, 358, 420) of the locking mechanism (46, 146, 346, 446) is preloaded by a spring element (60, 158, 356, 426) to lock.

3. The torque tool as in claim 1, wherein the free space (58) is formed by an axial hole (56) in the adapter (30), into which the locking element (50) is moved by the electrically operated actuator (62) to unlock the locking mechanism (46).

4. The torque tool as in claim 1,
wherein a spring-loaded locking body (160) is provided,
wherein the locking element (150) is moved into the free space (168) by the electrically operated actuator (162) to unlock the locking mechanism (146), and
wherein the locking body (160) pushes the locking element (150) into the recess (172) of the housing (114) to lock.

5. The torque tool as in claim 1,
wherein the free space (376) is provided in a spring-loaded locking lever (354), which moves the locking element (350) into the free space (376) by the electrically operated actuator (364), to unlock the locking mechanism (346), and
wherein the locking lever (354) pushes the locking element (358) into the recess (362) of the housing (314) to lock the locking mechanism (346).

6. The torque tool as in claim 1,
wherein the free space (468) is formed a spring-loaded body (428) with a conical tip (430), which is arranged in an axial channel (416) of the main body (412),
wherein the locking element (420) is moved into the free space (468) by the electrically operated actuator (434) to unlock the locking mechanism (446), and
wherein the body (428) with the conical tip (430) pushes the locking element (420) into the recess (438) of the housing (414) to lock.

7. The torque tool as in claim 1,
wherein the locking element (50, 150, 358, 420) of the locking mechanism (46, 146, 346, 446) comprises one or more balls (52, 152, 360, 422) or cylindrical rollers, and
wherein the one or more balls (52, 152, 360, 422) or cylindrical rollers are precluded from moving while the locking mechanism (46, 146, 346, 446) is locked.

8. The torque tool as in claim 1, wherein the drive shaft (18, 118, 318) is formed as a torsion bar (20, 120, 320) for measuring the torque based on a degree of deformation of the torsion bar.

9. The torque tool as in claim 8, wherein the sensor (74, 174, 374) comprises a strain gauge (22, 122, 322) which is provided on the torsion bar (20, 120, 320) to measure the torque.

10. The torque tool as in claim 1, wherein the sensor (74, 174, 374) includes an electronic control unit which drives the electrically operated actuator (62, 162, 364, 436) of the release mechanism (44, 144, 344, 444) to release.

11. The torque tool as in claim 1,
wherein the free space is arranged in the common axis and wherein the inner steel ball is radially pushed out of a free space by the plunger.

* * * * *